United States Patent Office 3,576,696
Patented Apr. 27, 1971

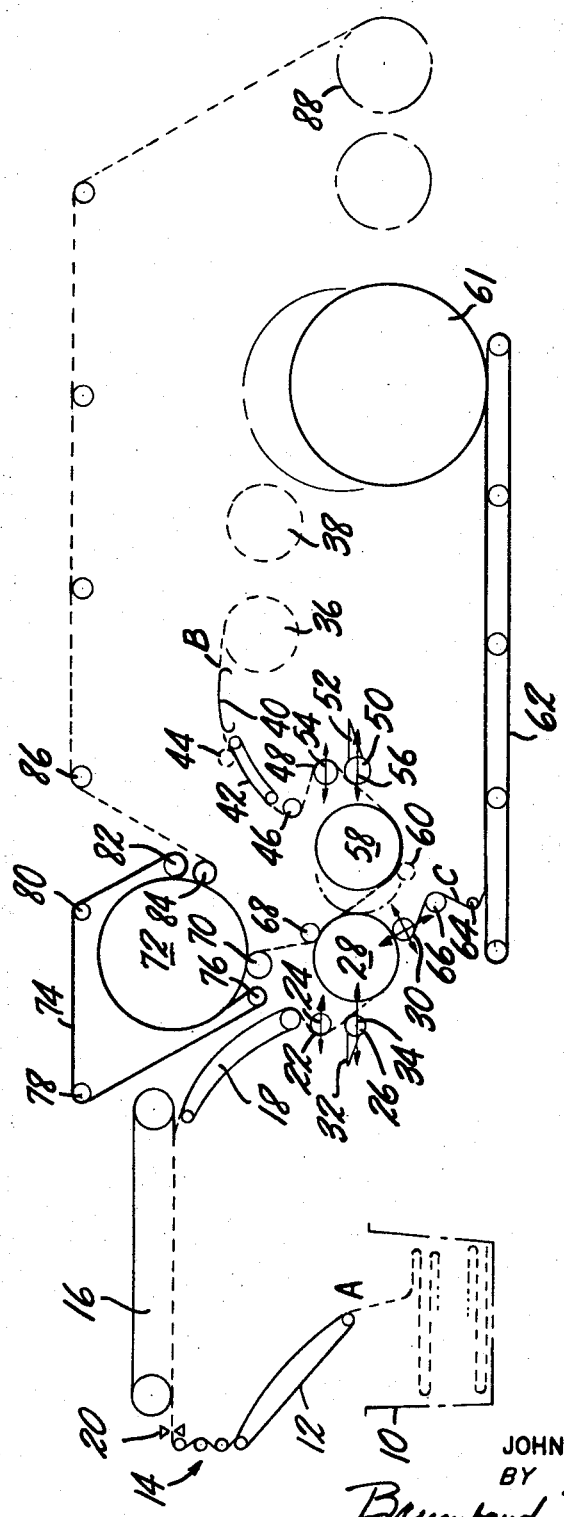

3,576,696
APPARATUS FOR PRODUCING LAMINATED PRODUCT
John Reginald Normanton, Altrincham, Hale, England, assignor to The Duplan Corporation, Winston-Salem, N.C.
Continuation-in-part of application Ser. No. 700,147, Jan. 24, 1968. This application July 11, 1969, Ser. No. 841,065
Claims priority, application Great Britain, July 11, 1968, 33,208/68, 33,209/68
Int. Cl. B32b 31/04
U.S. Cl. 156—547         12 Claims

ABSTRACT OF THE DISCLOSURE

An apparatus for producing a laminated product of either two or three webs in which means is provided for imparting a predetermined uniform longitudinal tension in said web and for feeding the tensioned web to an adhesive applying means by a tenter conveyor capable of transversely aligning the web and by a conveyor having a high friction surface for maintaining the web in tensioned transversely aligned condition.

---

This invention is a continuation-in-part of the copending application of John Reginald Normanton, Ser. No. 700,147, filed Jan. 24, 1968.

The invention relates to the production of laminated products and particularly to an apparatus for laminating two or three webs in which at least one of the webs is longitudinally tensioned, transversely aligned and the tensioned, aligned condition maintained at least until lamination.

Although the invention has a more general application, it is particularly applicable to the production of laminated fabrics wherein the face fabric web is tensioned in a longitudinal direction and aligned in the transverse direction before lamination with the lining fabric.

An object of the present invention is to provide apparatus for longitudinally tensioning and transversely aligning one web and then maintaining the tensioned and aligned condition of the web while adhesive is applied to one surface thereof and the web is brought into contact with another web to which it is to be laminated.

Another object of the invention is to provide means for feeding and adhesively coating one surface of another web to which the first web is to be laminated.

Still another object of the present invention is to provide means for feeding a third web which is to be introduced as the intermediate web of a laminated product by bringing said third web into contact with the adhesive coated surface of one of the outer webs and permitting that web to carry the intermediate web into pressure engagement with the other of said outer webs.

These and other objects of the present invention will be apparent from the detailed description which follows and by reference to the accompanying drawing which shows the present invention schematically.

The invention is described herein as applicable to the manufacture of laminated fabrics, for example, laminations of face fabric and lining webs or laminations of face fabric and lining webs having an intermediate web to impart bulking and eliminate drape. In laminated fabrics of this type the face fabric may be Orlon, Acrilan or single jersey, the lining fabric may be of acetate or nylon tricot and the intermediate web may be .5 mm. or .75 mm. polyurethane foam. Such webs can be bonded by acrylic, urethane, polyvinyl acetate or nitrile adhesives.

Referring to the drawing, the face fabric web A is stored in a batch box 10 from which it is drawn by an input conveyor arrangement which includes a lift conveyor 12, a bank of tension rollers 14, a horizontal tenter chain conveyor 16 and a receiving and delivery conveyor 18. The lift conveyor 12 provides a positive feed to carry the web A to the tension rollers which impart predetermined longitudinal tension in the web. The web A is then transferred to the tenter chain conveyor 16 which maintains the tension while imparting any necessary transverse alignment to the web.

Conveyor 12 is an endless conveyor, either a slat conveyor or an endless band, or blanket, conveyor of which the operative reach is curved convexly, being the surface on which the fabric A is carried, such that there is frictional engagement between the fabric A and the surface of the conveyor. By this means, the fabric A is positively picked up by the conveyor 12 and delivered to the bank of tension rollers 14. Conveyor 12 is driven and its drive is geared to the bank of tension rollers 14, which rollers are rotated at different speeds so as to provide an initial (or ideal) tension in the fabric A before it is passed on to the tenter chain conveyor 16.

The conveyor 16 is preferably a pin type tenter which includes a pair of endless chains carrying pins which engage and hold opposite edges of the web. Such tenter chain conveyors are conventional and are described in the American Cotton Handbook by Merrill, Macormac & Mauersberger, Textile Book Publishers, Inc., 2nd Revised Edition, 1949.

The apparatus is provided with photo-electric edge sensing means 20 for insuring that the selvedges of fabric A are correctly positioned on the pins of tenter chain conveyor 16.

The chains of the tenter chain conveyor 16 are adapted so that they can be individually driven at different speeds as required, so that any transverse misalignment of the grain or pattern of the fabric may be corrected before the fabric reaches the take-off point of the tenter chain conveyor 16.

The receiving conveyor 18 comprises a convexly curved conveying surface which is presented to the fabric A as it passes from the tenter chain conveyor. The receiving conveyor is preferably a slat conveyor in which the outer surfaces of the slats are provided with friction material, or the conveyor may be an endless band or blanket with an outer surface of webbing belt, rubber or other friction material to insure that there is frictional engagement between the fabric and the surface to prevent the tension in the fabric from being lost before it reaches the adhesive application zone. If the tension is lost there is usually an undesirable reduction in width of the fabric. Other undesirable movements within the fabric structure take place if the tension is not maintained. Conveyor 18 is adapted to be driven by a variable speed drive so that the tension in the fabric A may be increased or decreased, depending upon the type of fabric being used.

From the conveyor 18 the fabric A passes to conventional expander roll 22 which is movable bodily in the direction indicated by arrows 24 so as to vary the angle of lap between the expander roll 22 and the fabric A. This adjustability of the axis of the expander roll 22 also makes it possible to regulate the tension and expansion of the fabric A before it is presented to adhesive application roll 26.

Fabric A comes into contact with the periphery of roll 26 so as to pick up adhesive in the manner described in the above-identified parent application. The adhesive coated web A then passes into engagement with a variable speed, steam heated, laminating roller 28, with which is associated a tracking roller 30. The roller 28 carries the adhesive coated web A through part of a revolution thereof while leaving an exposed adhesive surface for the removal of solvent from the adhesive. The tracking roller 30 serves to guide an intermediate fabric web C into contact with the adhesive coated surface of fabric A and the conjoined fabric, and then passes around part of the periphery of the laminating roller 28.

The roller 26 and the adhesive trough 32 associated therewith are movable towards and away from the roller 28 as illustrated by arrow 34 in the accompanying drawings.

The above is a description of the face fabric side of the apparatus, and all of the driven components, namely, conveyor 18, adhesive roller 26 and laminating roller 28, are driven by variable speed drives. Such variable speed drives are coupled in a master and slave arrangement with the drive to laminating roller 28, such latter drive forming the master drive. This arrangement provides that the speed of each of the slave drives will follow that of the drive to roller 28 to prevent creasing or wrinkling, or overstretching of the fabric A at any one of the components driven by said drives.

On the lining fabric side of the apparatus there is provided a batch roll 36 of lining fabric with provision for a reserve roll 38 of such fabric. As such fabric B is used it is unrolled from batch roll 36 to pass over a curved guide plate 40 onto a small pin-feed conveyor 42 having brushes 44 above the convexly curved operative span to brush the fabric onto the pins of the conveyor. Batch roll 36 is movable towards the curved plate 40 as the fabric B is removed therefrom. The conveyor 42 presents a convexly curved supporting surface as shown in order to maintain the longitudinal tension in the lining fabric B. In the example, the pin-feed conveyor 42 is not driven, but in other instances it may be advantageous to drive this small conveyor. A blanket conveyor of a type similar to the conveyors 12 or 18 may be used in place of pin-feed conveyor 4 if desired.

The fabric B is removed from the pin-feed conveyor 42 by driven take-off roll 46 and from this roll the fabric passes around an expander roll 48 (which is similar to expander roll 22 on the face fabric side) and then around an adhesive application roller 50 which has an adhesive trough 52, the roll 50 and trough 52 being identical with roller 26 and trough 32 on the face fabric side. Again expander roll 48, adhesive roll 50 and trough 52 are movable as indicated by arrows 54 and 56 respectively, so that the angle or lap of the lining fabric B on rolls 48 and 50 may be varied.

The fabric B, with adhesive applied thereto by roll 50, passes around a second steam heated variable speed laminating roller 58 which although shown in inoperative position spaced from roll 28 on the face fabric side does in fact take up the position shown by chain dotted lines in the drawing to provide a nip with said roller 28 when the apparatus is in use. Thus, the adhesive coated fabric B meets the surface of the center fabric C at the nip between rollers 28 and 58, opposite to the surface where center fabric C is adhered to adhesive coated fabric A and it is at this nip that lamination of the three fabrics A, B and C is completed.

As an alternative to providing the tracking roller 30 for fabric C, a tracking roller 60 may be provided. Roller 60 is associated with roller 58 and in this case fabric C would be lapped around roller 60 and would first meet adhesive coated fabric B, rather than fabric A, and the combination of fabrics B and C would travel around the periphery of roller 58 to the nip of rollers 28 and 58, while adhesive coated fabric A would be presented to the opposite side of fabric C from fabric B.

The lining fabric side of the apparatus is also provided with a master and slave drive arrangement similar to the face fabric side, the drive to the laminating roll 58 forming the master drive for the lining fabric side. All of the other drives on the lining fabric side, as well as being independently variable in speed, are slaves to the drive of roller 58.

In the example, the master and slave drive arrangements for the face fabric and the lining fabric sides are D.C. motor master and slave arrangements, which arrangements are well known in other branches of engineering. Alternatively, the drive arrangements can be mechanical if desired.

Center fabric C is led to the laminating nip from a batch roll 61. The fabric passes from roll 61 to, and is carried by, a variable speed conveyor 62, passes around an idler roller 64 and then around an expander roll 66, the latter being similar to expander rolls 22 and 48 previously described. From expander roll 66, center fabric C is either fed to tracking roll 30 (as shown) or to tracking roll 60, depending upon the arrangement used. In either case, the tracking roll 30 or 60 is universally movable in a two-dimensional plane, inasmuch as the tracking roller 30 can be adjusted around the periphery of its associated laminating roller 28 or 58, or towards or away from such laminating roller so as to vary the point at which the center fabric C meets the adhesive coated fabric A or B.

From the laminating nip between rollers 28 and 58, the combined laminate, made up of fabrics A, B and C, passes between the nip defined by laminating roller 28 and a pressure roller 68, which is urged under pressure against the periphery of roller 28 at the position shown. Roller 68 may be urged by means of a pneumatic cylinder means or spring means, or any other suitable means as desired.

From this pressure nip, the combined laminate passes around another expander roll 70 (of the type already mentioned) and into contact with a large steam-heated cylinder 72. The combined laminate engages approximately three-quarters of the periphery of this cylinder 72 and is held in contact therewith, as it travels therearound, by means of an endless flexible banket 74 driven by a variable speed drive and guided by guide rollers 76, 78, 80 and 82. Before leaving the cylinder 72 the combined laminate passes between a further pressure nip defined by cylinder 72 and a roller 84 which is urged under pressure, by any suitable means such as pneumatic cylinders, against the periphery of cylinder 72 as shown. Finally the combined laminate passes around driven support rollers 86 which are driven from the drive of blanket 74 before being wound onto an axle to form a batch roll 88. The axle for batch roll 88 is also driven from the drive to blanket 74 through a friction clutch. Additional axles driven through friction clutches for additional batch rolls are also provided.

It will be appreciated that the above-described apparatus can be used for laminating any two of the fabrics A, B and C, the third fabric being omitted.

I claim:

1. An apparatus for producing a laminated product comprising a supply of a longitudinally stretchable web, means for applying adhesive on one surface of said web for the purpose of laminating the web to another web, tensioning means for imparting a predetermined uniform longitudinal tension in said web before the adhesive is applied, a tenter conveyor for carrying the tensioned web toward the adhesive applying means, said tenter conveyor including at least a pair of endless gripper carriers gripping opposite edges of the web and drive at relative speeds necessary to align the tensioned web transversely, and a receiving carrier movable in a closed path which includes a curved operative span having a surface with a high coefficient of friction onto which the web is fed from the tenter conveyor to grip the tensioned, transversely-oriented web and carry it from the tenter conveyor to the adhesive applying means along a curved path while maintaining the web in its tensioned, transversely-oriented condition.

2. An apparatus as set forth in claim 1 including a lift carrier movable in a closed path above the web supply and having a convexly curved operative span for uniformly engaging the web across its width and lifting the web from the supply and feeding it to the tensioning means without drag.

3. An apparatus as set forth in claim 1 including an expander roll engaging the web intermediate the receiving carrier and the adhesive applying means for spreading the web transversely and having an adjustably mounted axis to vary the angle of feed of the web to the adhesive applying means.

4. An apparatus as set forth in claim 1 including a drum for receiving the surface of the web opposite to the side on which the adhesive has been applied and carrying the web through an arc while at the same time providing an exposed adhesive surface for the removal of excess solvent therefrom, and another drum in pressure engagement with said first mentioned drum for carrying another adhesive coated web through an arc before bringing the two webs into pressure engagement.

5. An apparatus as set forth in claim 4 in which the first mentioned web is a face fabric and the second mentioned web is a lining fabric and including a supply of the lining fabric web, adhesive applying means for applying adhesive to one surface of said lining fabric web, and a fabric carrier movable in a closed path and having a convexly curved operative span for feeding the lining fabric from the supply toward the adhesive applying means.

6. An apparatus as set forth in claim 5 including an expander roll engaging the lining fabric web intermediate the fabric carrier and the adhesive applying means for spreading the web transversely and having an adjustably mounted axis to vary the angle of feed of the lining fabric web to the adhesive applying means.

7. An apparatus as set forth in claim 4 including a tracking roll adjacent at least one of said drums for guiding a third web into pressure contact with one of the adhesive coated webs before the three webs are brought together in pressure engagement by the said drums.

8. An apparatus as set forth in claim 1 including a drum for receiving the surface of the web opposite to the side on which the adhesive has been applied and carrying the web through an arc while at the same time providing an exposed adhesive surface for the removal of solvent therefrom, and a tracking roll for bringing another web into pressure contact with the adhesive surface of said first mentioned web.

9. An apparatus as set forth in claim 8 including a variable speed conveyor for feeding the other web to the tracking roll and an expander roll engaging the said other web intermediate the variable speed conveyor and the said tracking roll.

10. An apparatus for producing a laminated fabric comprising a supply of longitudinally stretchable face fabric web, a supply of lining web which is relatively unstretchable in the longitudinal direction, means for applying adhesive to one surface of the face fabric web, means for applying adhesive to one surface of the lining web, means for imparting a predetermined longitudinal tension in said face fabric web intermediate the supply and the face fabric adhesive applying means, means for transversely aligning the tensioned face fabric web, said transverse aligning means including a tenter conveyor having a pair of endless gripper carriers gripping opposite edges of the face fabric web and driven at the relative speeds necessary to align the face web transversely, an expander roll for transversely spreading the face fabric web before it is presented to the adhesive applying means, an expander roll for transversely spreading the lining fabric before it is presented to the lining adhesive applying means, and a pair of drums in tangential relation, each carrying one of the webs through part of a revolution with the adhesive side exposed for the removal of solvent before bringing the webs into face-to-face engagement.

11. An apparatus as set forth in claim 10 including a conveyor having a high coefficient of friction to receive the longitudinally tensioned and transversely aligned face fabric thereon.

12. An apparatus as set forth in claim 10 including a supply of a third web and means for guiding said third web into engagement with the adhesive-coated surface of one or the other of the two webs while the said adhesive-coated web is being carried through part of a revolution by one of said drums.

References Cited

UNITED STATES PATENTS

| | | | |
|---|---|---|---|
| 666,207 | 1/1901 | Oeser | 156—551 |
| 2,429,177 | 10/1947 | Young | 156—496X |
| 2,726,979 | 12/1955 | Grant | 156—313 |
| 2,993,523 | 7/1961 | Monaco et al. | 156—495X |
| 3,050,109 | 8/1962 | Monaco | 156—324X |
| 3,316,137 | 4/1967 | Wisotzky | 156—324X |

SAMUEL FEINBERG, Primary Examiner

J. M. HANLEY, Assistant Examiner

U.S. Cl. X.R.

156—164, 229, 496, 551